United States Patent Office 3,519,450
Patented July 7, 1970

3,519,450
BINDING COMPOSITION
Charles Polis, 46—58 158th St.,
Flushing, N.Y. 11358
No Drawing. Filed Oct. 16, 1967, Ser. No. 675,314
Int. Cl. C04b 11/14
U.S. Cl. 106—114         5 Claims

ABSTRACT OF THE DISCLOSURE

A binding composition comprising a gypsum plaster, a lightweight granular aggregate and wheat paste, said wheat paste being present in an amount of 3% to 20% based on the dry weight of the total composition.

BACKGROUND OF THE INVENTION

Field of the invention

This invention relates to binding compositions and, more particularly, to a binding composition adapted to be used as a mortar for securing artificial fiberboard bricks to interior surfaces for decorative purposes.

Description of the prior art

On May 3, 1966, U.S. Pat. No. 3,248,834, entitled "Simulated Brick Interior Siding Assembly," issued to Charles Polis, the inventor of the present invention. Two procedures are described in the patent for installing the patented "bricks" on the surface to be decorated. Neither procedure has proved to be totally acceptable because of the difficulty of installation of the mortar and the economic considerations involved in preparing the assemblies.

Consequently, it was decided to adopt a procedure of installation similar to that utilized for actual brick laying. This procedure involves the steps of spreading a "mortar" onto the surface to be decorated and then pressing the "bricks," one at a time, into the "mortar." The word "mortar" is emphasized herein because it is intended to denote simulated mortar materials and not the real mortar or cement used in the installation of exterior bricks. In fact, one of the primary reasons for the development of the unique binding composition of the subject invention was the impracticality of using real mortar in the manner necessary for the installation of the interior "bricks." Real mortar, in its liquid state, is much too heavy and fails to provide the required adhesion for flat vertical installation of the artificial "bricks."

To overcome the deficiencies of real mortar and, yet, retain the authentic mortar-like appearance for the "brick" assembly, a variety of commercial binding compositions was tried and all were found to be inadequate for one reason or another. For example, one such composition which is a pre-mixed perlited, basecoat plaster manufactured by The United States Gypsum Company and sold under the trademark "Structo-Lite," was tried. Although the composition had a mortar-like appearance, it was inadequate for the following reasons: the drying time was much too rapid to permit precision installation of the "bricks"; cracking and crumbling occurred between bricks after drying; and the composition failed to adhere to a variety of wall structures.

It was, thus, found to be impossible to obtain all of the desired qualities from any of the binding compositions heretofore known.

SUMMARY OF THE INVENTION

The present invention provides a binding composition that not only possesses an authentic mortar-like appearance, but has all of the properties necessary to provide the desired drying time and the desired excellent adhesion to all surfaces. These qualtities are accomplished in accordance with the present invention by adding wheat paste to a mixture of gypsum plaster and a lightweight granular aggregate in an amount calculated to reduce the drying time of the composition, to render the composition more workable, and to greatly improve the adhesive properties of the composition. The wheat paste is added in an amount sufficient to provide all of the above advantages without destroying or altering the mortar-like appearance of the composition.

DESCRIPTION OF THE PREFERRED EMBODIMENT

A pre-mixed plaster composition such as that defined in A.S.T.M. specification numbers C–28 and C–35 is utilized as the basic ingredient of the preferred embodiment of the subject invention. This composition comprises a calcined gypsum plaster and a lightweight granular aggregate, which aggregate has particular importance, since the resulting binding composition is primarily intended to be used for vertical installation of the artificial "bricks" and excessive weight has been found to be a problem with such installations.

A specific commercial product which contains the above ingredients in the desired proportions is the above-mentioned "Structo-Lite." This product comprises a mixture of calcined gypsum plaster and expanded perlite. The plaster is pre-mixed at the mill and it is designed to function as a base to receive various finished coats. When mixed in accordance with A.S.T.M. specifications, the plaster contains not more than three to four cubic feet of mineral aggregate per 100 pounds of calcined gypsum plaster, to which may be added fiber and material to control working quality and setting time.

Expanded perlite, which is a siliceous volcanic glass property expanded by heat, is the preferred mineral aggregate, however, most lightweight aggregates, such as expanded vermiculite, can also be used in carrying out the invention.

The essence of this invention is the addition of wheat paste, a commonly used wallpaper adhesive, to the plaster and aggregate combination in the proper proportions. This heretofore unknown mixture of two common materials results in a most unique binding composition having the precise properties for the specific installation of the above described artificial bricks, as well as other similar functions.

The following is a typical formula for a ready-mixed mortar made following this invention and is a preferred embodiment thereof:

Formula:                                                Pounds
    Calcined gypsum plaster and perlite _____ 80
    Wheat paste _____ 5

In order to obtain the most desirable mortar for application to the surface to be decorated, the above composition is dry mixed in a rotating drum for about fifteen minutes. Approximately six pounds of the mixture is then mixed with about 3 quarts of water to form a workable mixture for the final application on the wall surface.

Although the preferred embodiment provides for the use of approximately 6% wheat paste based on the dry weight of the total composition, it has been found that a satisfactory mortar may be obtained when wheat paste is added in an amount ranging from 3% to 20%. If a smaller amount of wheat paste is used the mixture takes on the undesirable characteristics of the 100% pre-mixed plaster, and when wheat paste is added in an amount greater than 20% the mixture loses its mortar-like appearance, becomes lumpy and the drying time is increased to an undesirable duration.

In some instances, in order to further enhance the appearance of the mortar composition, a black non-oxide synthetic earth pigment may be added to the composition. One such synthetic which is sold under the trademark "Lansco" has been used successfully to tint the mortar to the desired shade of grey. The following is a formula which incorporates the use of a tinting agent to obtain the desired results:

Formula:

| | |
|---|---|
| Calcined gypsum plaster and perlite | 80 pounds |
| Wheat paste | 5 pounds |
| Tinting agent | 4½ ounces |

The above composition, as with the previous composition, should be mixed for about fifteen minutes in a rotating drum and then six pounds of the composition should be mixed with approximately 3 quarts of water to provide a mortar having the desired consistency.

It will be apparent from the above description that the present invention provides a unique binding composition that is exceptionally well suited for its specifically intended use, as well as for other similar uses. The composition provides a remarkably authentic mortar appearance and, yet, is lightweight and possesses excellent adhesive and drying qualities.

While there has been described what is at present considered to be the preferred embodiment of this invention, it would be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. In combination, a calcined gypsum plaster; a lightweight granular aggregate; and wheat paste for retarding the drying time and improving the adhesion of a plastic mortar formed when said combination is gauged with water; said wheat paste being present in an amount of 3% to 20% based on the dry weight of the total combination.

2. The combination of claim 1 wherein said aggregate is selected from the group consisting of expanded perlite and expanded vermiculite.

3. The combination of claim 1 wherein said wheat paste is present in an amount of 6% based on the dry weight of the total composition.

4. A binding composition adapted to be used as a mortar for interior artificial fiberboard bricks, said composition comprising: a gypsum plaster; a granular aggregate; wheat paste in an amount of 3% to 20% based on the dry weight of the total combination; and a tinting agent.

5. The binding composition of claim 4 wherein said aggregate is selected from the group consisting of expanded perlite and expanded vermiculite.

References Cited

UNITED STATES PATENTS 2,833,660   5/1958   Busatti _____ 106—114

JAMES E. POER, Primary Examiner

U.S. Cl. X.R.

106—315